United States Patent [19]
D'Offay

[11] Patent Number: 5,536,397
[45] Date of Patent: Jul. 16, 1996

[54] POOL SKIMMING DEVICE

[76] Inventor: Robert A. D'Offay, 3 Ravel Road, Walmer Heights, Port Elizabeth, South Africa

[21] Appl. No.: 427,220

[22] Filed: Apr. 24, 1995

[30] Foreign Application Priority Data

Apr. 25, 1994 [ZA] South Africa ............... 94/2848

[51] Int. Cl.⁶ ............... E04H 4/16; B01D 29/11
[52] U.S. Cl. ............ 210/169; 210/232; 210/249; 210/416.2; 4/492
[58] Field of Search ............... 210/169, 232, 210/249, 416.2, 455, 456, 460, 495; 4/490, 492

[56] References Cited

U.S. PATENT DOCUMENTS

| | | | |
|---|---|---|---|
| 4,746,424 | 5/1988 | Drew | 210/169 |
| 4,994,178 | 2/1991 | Brooks | 210/169 |
| 5,264,122 | 11/1993 | Lakotish | 210/169 |
| 5,279,728 | 1/1994 | Weiss . | |
| 5,350,508 | 9/1994 | Van Der Watt | 210/169 |
| 5,454,940 | 10/1995 | Lakotish | 210/169 |

FOREIGN PATENT DOCUMENTS

| | | |
|---|---|---|
| 803568 | 6/1980 | South Africa . |
| 821853 | 3/1982 | South Africa . |
| 848780 | 11/1984 | South Africa . |
| 851614 | 3/1985 | South Africa . |
| 853649 | 5/1985 | South Africa . |
| 867408 | 9/1986 | South Africa . |
| 861911 | 10/1986 | South Africa . |
| 877643 | 10/1987 | South Africa . |
| 878421 | 11/1987 | South Africa . |
| 878888 | 11/1987 | South Africa . |
| 885179 | 7/1988 | South Africa . |
| 889712 | 12/1988 | South Africa . |
| 889713 | 12/1988 | South Africa . |
| 891785 | 3/1989 | South Africa . |
| 893326 | 5/1989 | South Africa . |
| 894424 | 6/1989 | South Africa . |
| 907919 | 10/1990 | South Africa . |
| 911186 | 2/1991 | South Africa . |
| 914657 | 5/1991 | South Africa . |
| 914454 | 6/1991 | South Africa . |
| 919282 | 11/1991 | South Africa . |
| 921458 | 2/1992 | South Africa . |

Primary Examiner—Peter A. Hruskoci
Assistant Examiner—Theodore M. Green
Attorney, Agent, or Firm—Watts, Hoffmann, Fisher & Heinke Co.

[57] ABSTRACT

The skimming device is designed for use in a swimming pool to skim leaves and other floating debris off the surface of the pool water. The device includes a conduit apparatus incorporating a pipe which terminates at one end in a connection arrangement which connects to the return flow inlet of the swimming pool and at the other end in a nozzle. The conduit apparatus is then self-supporting relative to the return flow inlet. A porous trap is supported relative to the conduit apparatus with the mouth of the trap at the surface of water in the swimming pool and spaced from the nozzle with the nozzle aimed towards the mouth. In operation, pressurised water conveyed by the pipe from the return flow inlet through the nozzle entrains floating debris from the surface of the swimming pool and directs it into the trap.

7 Claims, 2 Drawing Sheets

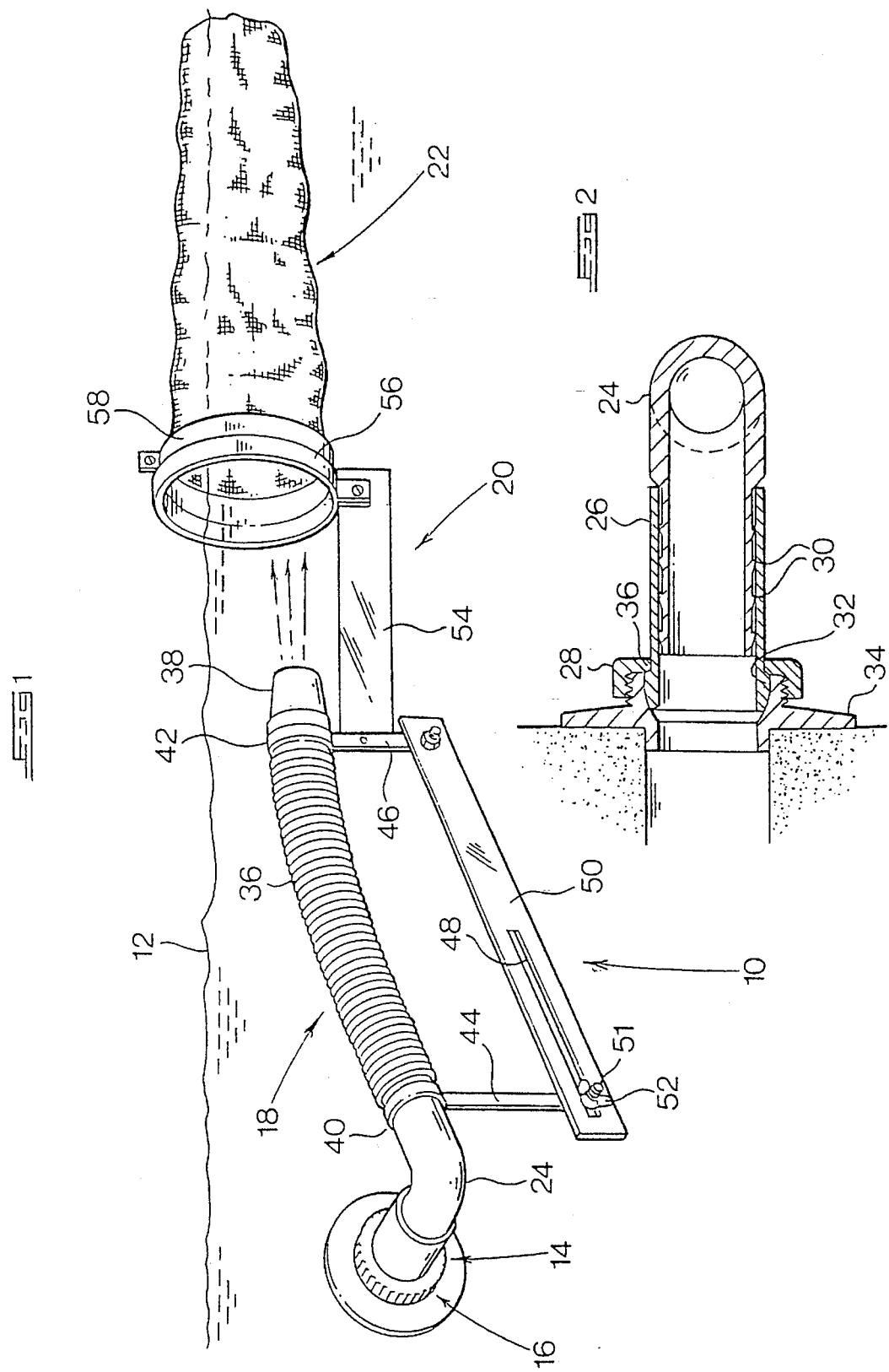

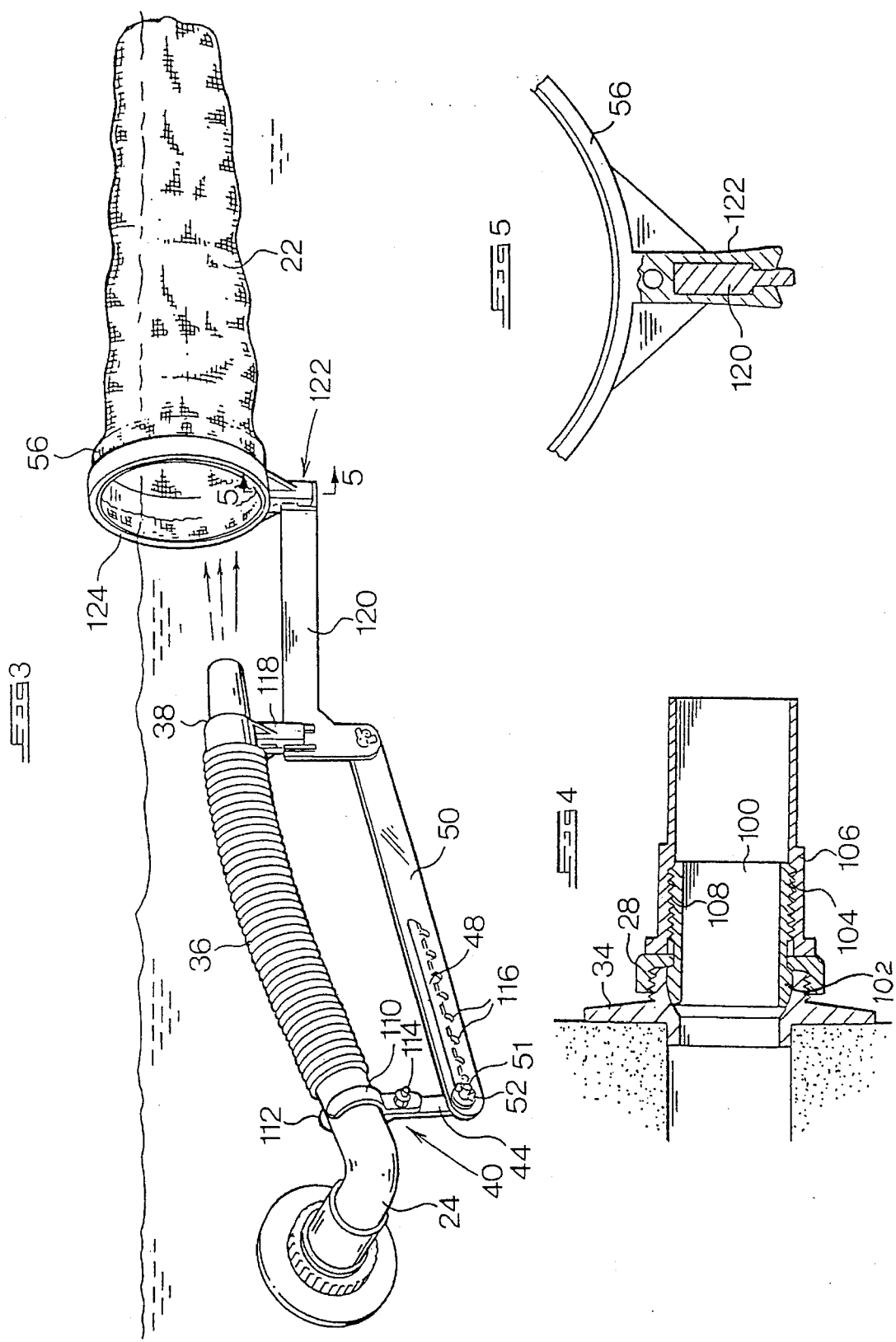

POOL SKIMMING DEVICE

BACKGROUND TO THE INVENTION

THIS invention relates to a pool skimming device.

A problem faced by swimming pool owners with limited time to maintain their pools is that of collecting and removing floating leaves and other debris from the pool surface. A number of pool skimming devices designed to address this problem have been proposed and are in use with greater or lesser degrees of success. However one of the main drawbacks experienced with the majority of the known skimming devices is the necessity for them to be fixed to the wall of the swimming pool. This generally requires holes to be drilled into the wall, often below the water level. This in turn necessitates at least partial emptying of the pool with a good deal of inconvenience and wastage of water.

SUMMARY OF THE INVENTION

According to the invention there is provided a swimming pool skimming device comprising:

a conduit apparatus including a pipe, connection means adapted to connect one end of the pipe to the return flow inlet of a swimming pool, a nozzle at the other end of the pipe, conduit support means which is attached to the pipe and which renders the conduit apparatus self-supporting relative to the return flow inlet when the connection means is connected thereto;

a porous trap having an open mouth, and trap support means which extends from the conduit support means and which supports the open mouth of the trap relative to the conduit apparatus with the mouth of the trap operatively at the surface of water in the swimming pool and spaced from the nozzle with the nozzle aimed towards the mouth so that, in use, a flow of pressurised water which is conveyed by the pipe from the return flow inlet through the nozzle entrains floating debris from the surface of the swimming pool and directs it into the trap.

Thus the only connection between the apparatus and the wall of the swimming pool is at the return flow inlet.

Preferably, the pipe is flexible and the conduit support means includes a stiffener for rigidifying the pipe. Conveniently, the stiffener comprises an elongate plastic strip, the ends of the pipe being connected relative to the plastic strip at respective attachment points, one of which is adjustable.

The trap support means may comprise a second, elongate plastic strip extending from the conduit support means. The trap may be in the form of a porous bag. Conveniently it comprises a length of nylon stocking.

According to a preferred feature of the invention, the connection means which is adapted to connect one end of the pipe to the return flow inlet comprises a tubular elbow to which the pipe is connectable and a socket in which the elbow is engagable and the other end of which is locatable in an externally threaded portion of a standard return flow fitting, the internally threaded collar of the standard return flow fitting being engagable with the externally threaded portion thereof to anchor the socket relative to the return flow fitting.

BRIEF DESCRIPTION OF THE DRAWINGS

The invention will now be described in more detail, by way of example only, with reference to the accompanying drawings in which:

FIG. 1 shows a perspective view of a device according to the invention;

FIG. 2 shows a detail of the connection to the return flow inlet;

FIG. 3 shows a view similar to that of FIG. 1, but of a second embodiment of the invention;

FIG. 4 shows a detail, similar to that of FIG. 2, of the return flow inlet connection; and FIG. 5 shows a cross-section at the line 5—5 in FIG. 3.

DESCRIPTION OF EMBODIMENTS

FIG. 1 shows a device 10 for skimming the surface of a swimming pool, the water level in which is designated with the reference numeral 12. The main components of the device 10 are a connection arrangement 14 for connection to the return flow inlet 16 of the pool, a conduit apparatus 18, an attachment means 20 and a porous trap 22 which is connected to the conduit apparatus 18 by the attachment means 20.

FIG. 2 illustrates details of the connection arrangement 14. This arrangement includes an elbow 24, a socket 26 and a collar 28. One end of the elbow 24 has a roughened exterior, denoted by the numeral 30, which locates as a tight interference fit in the bore of the socket 26. At its opposite end, the socket 26 is formed with a circumferential bulge 32 which is dimensioned to make a snug fit in the mouth of a return flow inlet fitting 34.

With the socket positioned as illustrated, the collar 28 is screwed onto the fitting 34, with the flange 36 of the collar abutting the bulge 32 and preventing removal of the socket 26.

In practice, the collar 28 and fitting 34 are part of a standard "Aimflow" return water unit supplied with modern swimming pools. In addition to the collar and fitting, the standard "Aimflow" unit includes a nozzle with a part-spherical surface that is trapped in the fitting by the collar. In order to install the device 10 of the present invention, all that is required is that the collar of the "Aimflow" unit be unscrewed and the nozzle removed. Thereafter the socket 26 is anchored in the illustrated position by the collar, as described above.

The conduit apparatus 18 includes a length of flexible pipe 36 which is attached to the other end of the elbow 24. A tapered tubular nozzle 38 is attached to the opposite end of the pipe 36, which may in practice be a length of corrugated plastics pipe of the kind commonly used with submerged, suction-type swimming pool cleaners. Brackets 40 and 42 are attached to ends of the conduit apparatus and have transversely projecting stems 44 and 46, which are connected to a plastic strip 50. In the case of the stem 46, connection is by means of a bolt and ordinary nut, while in the case of the stem 44, connection is by means of a bolt 51, which passes through a slot 48 in the strip 50, and a wingnut 52.

The elbow 24 is rotated manually relative to the socket 26 to set the depth of the nozzle 38 below the surface of the water. Thereafter the bolt 51 can be slid along the slot 48 as appropriate to flex the pipe 36 and hence to align the nozzle in a direction parallel to the water surface.

The attachment means 20 is also in the form of a plastic strip, designated 54, one end of which is attached to the stem 46. The opposite end of the strip 54 is secured to an annular member 56. An open end of the trap 22 is located about one end of the annular member 56 as illustrated, and is clamped in position by an encircling annular clamp 58. The trap is provided by an elongate, porous bag. In one example of the invention, the porous bag is provided by an end of a nylon stocking. The open mouth of the bag, defined by the annular member 56, is typically spaced about 10 cm from the nozzle 38, with the nozzle aimed into the bag and with the mouth of the bag partially submerged.

It will be noted that the only connection between the illustrated apparatus and the wall of the swimming pool is at the return flow inlet. In its submerged state, the device is self-supporting. The strip 50 has sufficient stiffness in the vertical plane to support the submerged mass of the conduit structure and enables the conduit structure in turn to support the submerged mass of the trap 22, via the strip 54. The connection to the return flow inlet is made in the simple manner described above and the self-supporting nature of the device then renders it unnecessary to drill holes into the wall of the swimming pool or to provide other supporting means to maintain the position of the device in the swimming pool.

In operation, pressurised water from the filtration unit flows through the return flow inlet. The water is conveyed through the pipe 36 to the nozzle 38. The stream of water which is injected into the open mouth of the trap 22 entrains floating leaves and other debris from the surface of the pool and directs them into the trap.

The leaves and debris are captured in the trap which is periodically detached, by loosening off the clamp 58, and emptied. The return water flows out of the trap and into the main body of swimming pool water.

In practice, it is preferred to set up the device in such a way that the water which flows out of the trap sets up a swirling motion in the pool which encourages leaves and other floating debris to migrate about the pool until they reaches the device 10, where they can be captured in the trap.

FIGS. 3 to 5 show a modified and currently preferred embodiment of the invention. In these Figures, components corresponding to those in FIGS. 1 and 2 are designated with the same reference numerals.

Referring to FIG. 4, the one-piece socket 24 of the first embodiment is replaced with a two-piece socket consisting of an annular member 100 which is formed at one end with an outwardly directed lip 102 and at the other end with external threads 104, and an annular member 106 formed at one end with an internal thread 108. In use, the collar 28 of a standard Aimflow unit is unscrewed from the fitting 34 and the internal nozzle is removed. The annular member 100 is then placed inserted into the fitting 34 and the collar is screwed back into position, thereby anchoring the member 100. The member 106 is then screwed onto the projecting end of the member 100, and an end of the elbow 24 is inserted forcibly into the free end of the member 106 as a tight interference fit, as illustrated.

In the embodiment of FIGS. 3 to 5, the bracket 40 is in the form of a clamp which has part-circular clamping elements 110 and 112 connected to one another by a nut and screw combination 114. The other end of the elbow 24 is captured between the part-circular clamping elements 110 and 112. An extension of the clamping element 112 forms the stem 44 which is connected to the strip 50 by means of a screw 51 projecting from the element 112, and a wingnut 52.

In this case, the slot 48 in the strip 50 is formed with a series of part-circular recesses 116 defining selective positions for the screw 51 along the length of the slot.

As in the first embodiment, one end of the pipe 36 is fitted tightly over the end of the elbow 24. There is a separate reduction nozzle 38, one end of which is fitted as a tight friction fit in the other end of the pipe 36. Projecting transversely from the nozzle 38 is a clevis 118. The stem 46 and strip 54 of the first embodiment are replaced by an L-shaped member 120, the upper corner of which is received as a tight slide fit between the arms of the clevis. The opposite end of the strip 50 is attached to the L-shaped member 120 by a screw and wingnut combination.

In FIG. 3, the bracket 56 is formed with a transversely projecting clevis 122 which clips onto the end of the L-shaped member 120 as illustrated in FIG. 5. The open mouth of the trap 22 is engaged over an externally tapered locking ring 124 which is then slipped tightly into the bracket 56, with the result that the trap is anchored in position with its open mouth facing the nozzle 38.

The second embodiment of FIGS. 3 to 5 operates in the same way as the first embodiment, with the pressurised return flow of water being directed into the trap and entraining floating debris which is then captured in the trap. Vertical and horizontal adjustments are achieved by rotating the elbow 24 as appropriate and by adjusting the position of the screw 51 along the length of the slot 48.

As an additional feature, not illustrated in the drawings, the elbow 24 in either embodiment could be formed with a series of spaced apart holes of different size in one limb, with a sleeve mounted rotatably over the relevant limb. The sleeve is formed with an opening which can be brought into register with a selected hole or holes in the elbow. When the opening is so aligned with one or more of the holes in the elbow, a portion of the return flow of water in the elbow can flow directly into the swimming pool without entering the pipe 36. By appropriate adjustment of the position of the sleeve on the elbow it is therefore possible to vary the pressure of the water flow which is injected into the trap 22.

I claim:

1. A swimming pool skimming device comprising:

a conduit apparatus including a flexible pipe, a stiffener for rigidifying the pipe, the stiffener comprising an elongate strip and the ends of the pipe being connected relative to the strip at respective attachment points, one of which is adjustable, connection means adapted to connect one end of the pipe to a return flow inlet of a swimming pool, a nozzle at the other end of the pipe, conduit support means which is attached to the pipe and which renders the conduit apparatus self-supporting relative to the return flow inlet when the connection means is connected thereto;

a porous trap having an open mouth; and trap support means which extends from the conduit support means and which supports the open mouth of the trap relative to the conduit apparatus with the mouth of the trap operatively at the surface of water in the swimming pool and spaced from the nozzle with the nozzle aimed towards the mouth so that, in use, a flow of pressurised water which is conveyed by the pipe from the return flow inlet through the nozzle entrains floating debris from the surface of the swimming pool and directs it into the trap.

2. A swimming pool skimming device according to claim 1 the return flow inlet is in a wall of the pool wherein the only connection between the apparatus and the wall of the swimming pool is at the return flow inlet.

3. A swimming pool skimming device according to claim 1 wherein the stiffener is an elongate plastic strip.

4. A swimming pool skimming device according to claim 3 wherein the trap support means comprises a second, elongate plastic strip extending from the conduit support means.

5. A swimming pool skimming device according to claim 4 wherein the trap is in the form of a porous bag.

6. A swimming pool skimming device according to claim 5 wherein the porous bag comprises a length of nylon stocking.

7. A swimming pool skimming device according to claim 1 wherein the connection means which is adapted to connect one end of the pipe to the return flow inlet comprises a tubular elbow to which the pipe is connectable and a socket in which the elbow is engagable and the other end of which is locatable in an externally threaded portion of a standard return flow fitting, the internally threaded collar of the standard return flow fitting being engagable with the externally threaded portion thereof to anchor the socket relative to the return flow fitting.

* * * * *

UNITED STATES PATENT AND TRADEMARK OFFICE
CERTIFICATE OF CORRECTION

PATENT NO. : 5,536,397
DATED : Jul. 16, 1996
INVENTOR(S) : Robert A. D'Offay

It is certified that error appears in the above-indentified patent and that said Letters Patent is hereby corrected as shown below:

Cover page, item [30], end of second line, the priority document number should read -- 94/2842 --

Signed and Sealed this

Eighteenth Day of February, 1997

Attest:

BRUCE LEHMAN

Attesting Officer        Commissioner of Patents and Trademarks